United States Patent [19]

Berry

[11] Patent Number: 5,570,281
[45] Date of Patent: Oct. 29, 1996

[54] METHOD AND SYSTEM FOR FACILITATING VISUAL CONNECTIONS BETWEEN OBJECTS USING HANDLES

[75] Inventor: Richard E. Berry, Georgetown, Tex.

[73] Assignee: International Business Machine Corporation, Armonk, N.Y.

[21] Appl. No.: 380,983

[22] Filed: Jan. 31, 1995

[51] Int. Cl.⁶ .............................. G05B 11/01; G06F 3/00
[52] U.S. Cl. .......................... 364/146; 364/188; 395/159
[58] Field of Search .................................... 364/188, 189, 364/146, 192; 395/155, 156, 157, 159

[56] References Cited

U.S. PATENT DOCUMENTS

| | | | |
|---|---|---|---|
| 5,168,441 | 12/1992 | Onarheim et al. | 364/146 |
| 5,345,550 | 9/1994 | Bloomfield | 395/156 |
| 5,408,659 | 4/1995 | Cavendish et al. | 395/650 |
| 5,428,734 | 6/1995 | Haynes et al. | 395/159 |
| 5,434,965 | 7/1995 | Matheny et al. | 395/159 |
| 5,455,951 | 10/1995 | Bolton et al. | 395/700 |
| 5,473,777 | 12/1995 | Moelfer et al. | 395/700 |
| 5,475,843 | 12/1995 | Halviatti et al. | 395/700 |
| 5,475,845 | 12/1995 | Orton et al. | 395/700 |

OTHER PUBLICATIONS

*Research Disclosure*, "Default Organization for Connected Object, " n349, May 5, 1993.
*IBM Technical Disclosure*, "Graphical Network Analyzer, " v36 n12, Dec. 1993, pp. 473–480.
*IBM Technical Disclosure*, "Interactive Schema Diagram to Visually Represent Tables of Related Data and Meaningful Joins Between Tables, " n9, Feb. 1991, pp. 243–246.
*IBM Technical Disclosure*, "Visual Representation of Database Query Definition, " n9, Feb. 1991, pp. 238–242.

*Primary Examiner*—Paul P. Gordon
*Attorney, Agent, or Firm*—Mark S. Walker; Jenkens & Gilchrist, P.C.

[57] ABSTRACT

Objects are provided with handles representing the most frequently used events and actions for that particular object. Each handle has a label indicating the name of the event or action it represents. The functions of the objects can be connected together using these handles. In addition, tile events and actions that are shown as handles can be changed by selecting them from a list. The display of the handles and/or labels can be turned off if desired.

18 Claims, 3 Drawing Sheets

METHOD AND SYSTEM FOR FACILITATING VISUAL CONNECTIONS BETWEEN OBJECTS USING HANDLES

TECHNICAL FIELD OF THE INVENTION

This invention relates in general to data processing systems, and more particularly to data processing systems for processing graphical object oriented developing environments.

BACKGROUND OF THE INVENTION

The operation of a computer system is controlled by a computer program or group of programs called the Operating System ("OS"). In early operating systems, such as UNIX, a computer user input commands to the OS using a command line interface ("CLI"). A typical CLI consisted of a prompt and cursor on the computer screen. The user could issue a command to the operating system by typing the name of a program or command and then pressing an "Enter" key to send this input to the OS. The OS would then process the command and respond accordingly.

Later, more advanced OSs were developed which utilized a graphical user interface ("GUI") in combination with a mouse or other form of pointing or selecting device. In GUIs, the mouse controls a cursor which typically is portrayed as an arrow on the computer screen. In addition, the computer screen is separated into different regions, wherein each region represents different aspects of the computer system like the OS or an application program. The user controls the computer system by using the mouse to move the cursor over a desired region and then selecting a desired operation.

Current state of the art GUIs utilize an object oriented design. The phrase "object oriented" refers to a programming and design method in which program elements are organized as groups of objects, objects are instances of classes, and multiple classes are linked by inheritance relationships. Each class has a set of attributes that define the purpose of that class within the computer system. The organization of the object classes is hierarchical and attributes may be shared and propagated either upward or downward in the hierarchy. For further explanation of object oriented programming and design, the reader is referred to Grady Booch, Object Oriented Design with Applications, pp. 25–74, 1991, which is hereby incorporated by reference.

In object oriented GUIs such as IBM's OS/2®, objects are represented as bitmaps on the computer screen. The background object on which other objects are displayed is called the "desktop." A user manipulates objects by using the mouse to perform actions on them. For example, the user can use the mouse to press a button object or move a window object. This type of GUI is preferable because all objects of a particular type are either of the same class or related to each other. Thus, a user can control all of the objects of a particular type by using the same methods, e.g., pressing a button by clicking the mouse over it.

With the advent of object oriented GUIs also came object oriented developing environments ("OODEs"). OODEs are computer programs or groups of programs that allow a software developer to create object oriented programs. OODEs typically have a palette of objects with which the developer builds an application. Each object on this palette is different and serves as a template for the developer. A palette object's attribute settings are the default settings for that object. To use an object on the palette, the developer copies the object and places the copy in the application. The copy of the palette object is called the "derived object." The derived object has the same attribute settings as the original palette object.

Once the derived objects have been placed in an application, the developer can modify the attribute settings to specify the relationships between the objects. The behaviors of multiple objects can be linked together. For example, a "clear" button can be linked to a "file name" text field. The link can be set such that when the button is pressed, the text currently in the field is deleted.

In prior art OODEs, this link between objects is represented as a line or arrow drawn from a source object to a target object, called a "connection." The source end of the connection identifies an event which the source object can cause while the target end represents an action the target part can perform. Thus, the connection indicates that when the event occurs at the source object the target object is to perform the associated action.

The developer typically specifies the events and actions at the ends of connections by using a series of pop-up windows and menus listing all possible events for the source objects and all possible actions for the target object. For most objects, the developer frequently uses only a small subset of the available choices. Nevertheless, the developer is forced to choose from the complete list of menu choices each time objects are linked. As a result, developers get annoyed and frustrated by having to repeatedly perform this tedious and time consuming task.

SUMMARY OF THE INVENTION

It is an object of the present invention to provide a system and method whereby developers can specify the behaviors of object connections in a time-efficient manner.

It is a further object of the present invention to provide a system and method whereby developers can specify the behaviors of object connections without expending unnecessary effort searching a menu for a desired choice.

The above and other objectives are met by providing handles on objects representing the most frequently used events and actions for that particular object. Each handle has a label indicating the name of the event or action it represents. Developers can connect objects together directly using these handles instead of having to display the pop-up window and list of events and actions for each connection. Developers can also change which events and actions are shown as handles by selecting them from the list. In addition, developers can turn off display of the handles and/or labels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of tile invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
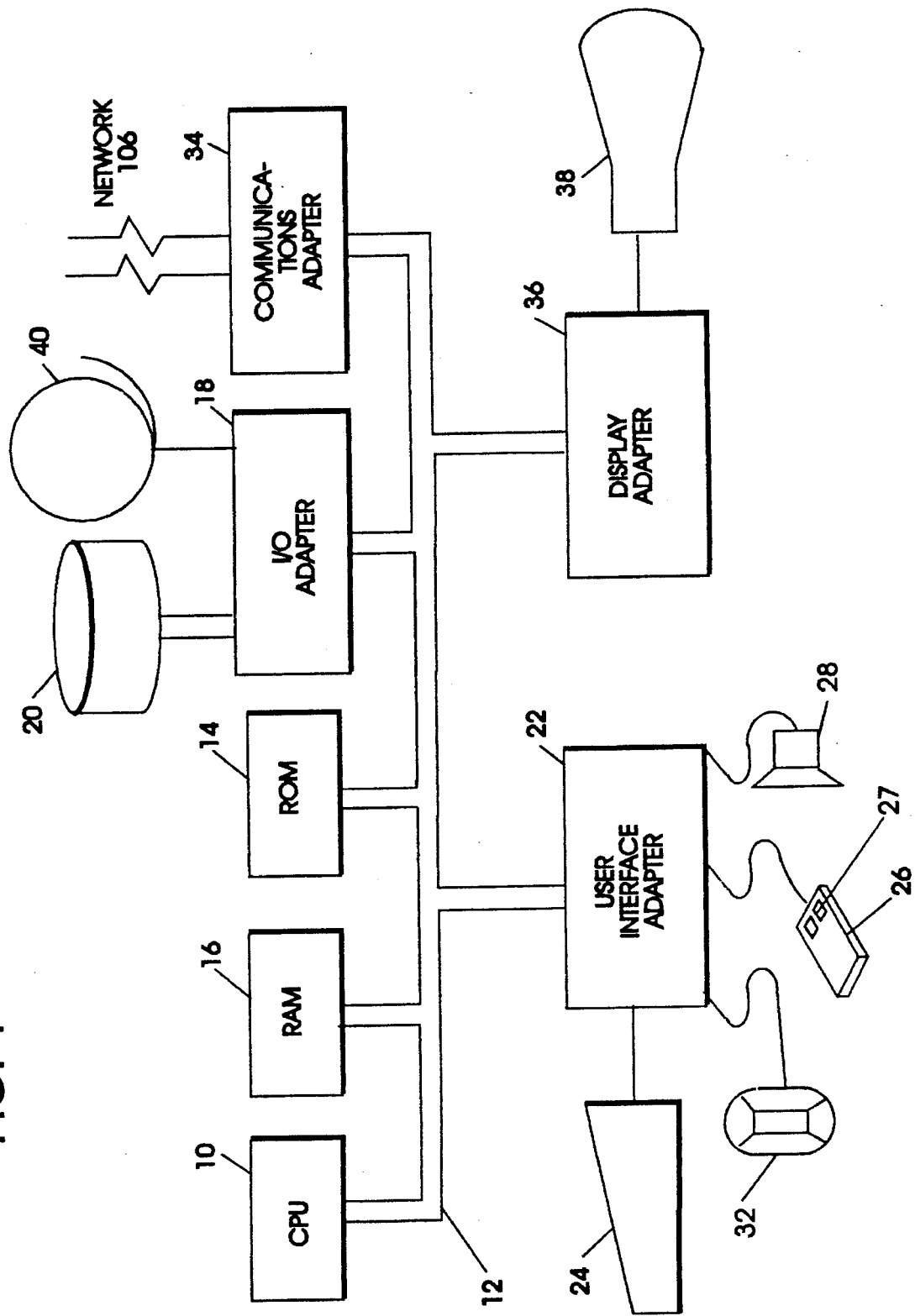
FIG. 1 is a computer system embodying a preferred embodiment of the present invention.

A representative hardware environment for practicing a preferred embodiment of the present invention is depicted in FIG. 1, which illustrates a typical hardware configuration of a workstation in accordance with the subject invention having central processing unit 10, such as a conventional microprocessor, and a number of other units interconnected via system bus 12. The workstation shown in FIG. 1 includes random access memory ("RAM") 14, read only memory ("ROM") 16, and input/output ("I/O") adapter 18 for connecting peripheral devices such as disk units 20 and tape drives 40 to bus 12, user interface adapter 22 for connecting keyboard 24, mouse 26 having button 27, speaker 28, microphone 32, and/or other user interface devices such as a touch screen device (not shown) to bus 12, communication adapter 34 for connecting the workstation to a data processing network, and display adapter 36 for connecting bus 12 to display device 38.

Figure 2:
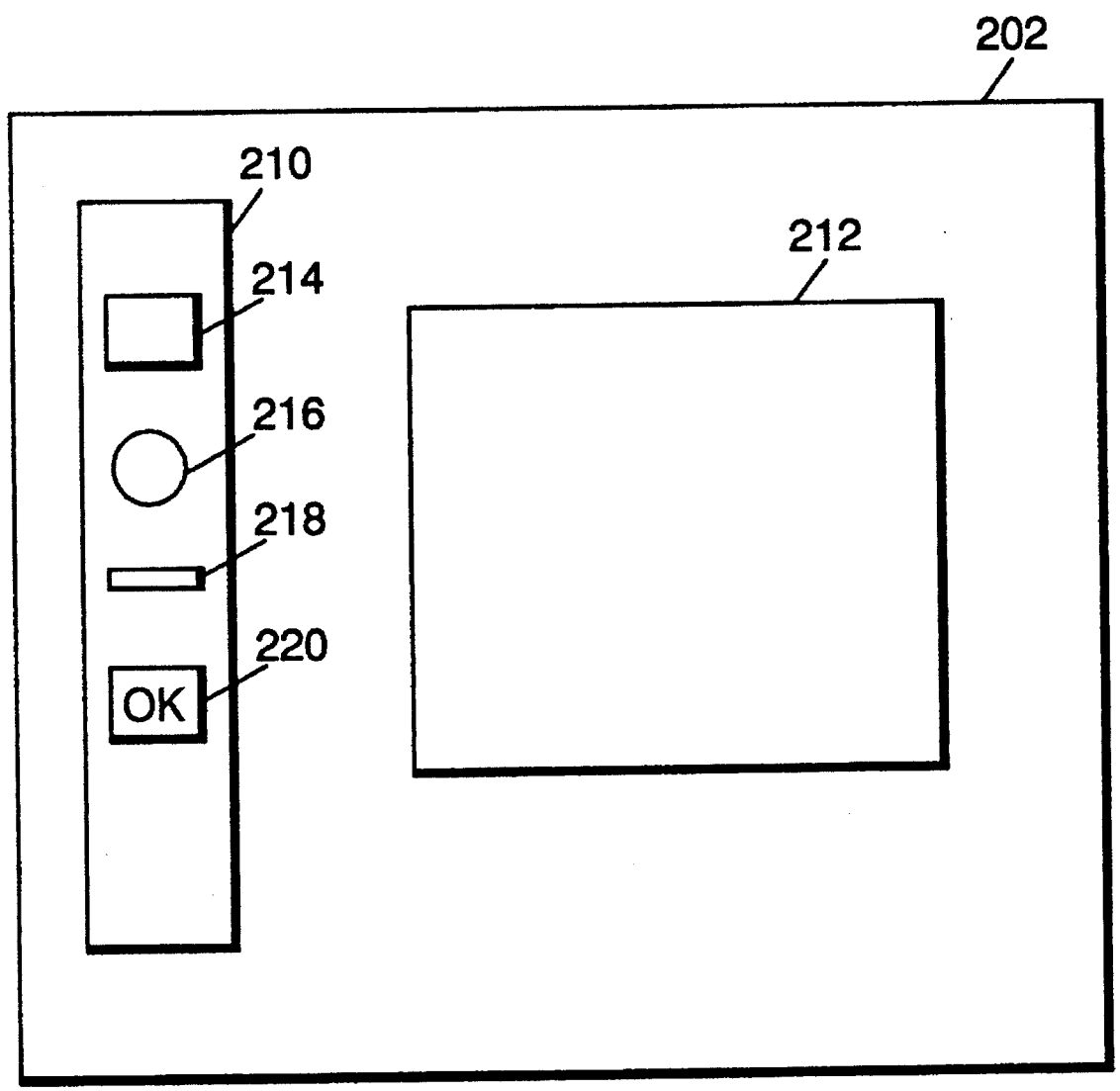
FIG. 2 is a pictorial representation of an object oriented developing environment displayed on a display device.

The display of an object oriented developing environment ("OODE") is shown in FIG. 2. Display 202 includes toolbar 210 containing a palette of objects and window 212 onto which the objects can be copied. The objects in the palette include rectangle 214, ellipse 216, text field 218 and button 220.

The OODE allows a program developer to create windows and then place objects in the windows. For example, after the developer creates window 212, the developer can copy objects 214–220 from toolbar 210 onto window 212. These copied objects are called "derived" objects. Derived objects are of the same class and instance as the object from which they were derived and take all of their attribute information from those objects.

Each object 214–220 has one or more attributes. The amount and type of attributes depends on the object's class. For example, button object 220 can contain attributes such as background color and text. Similarly, text object 218 has attributes such as background color and font. Window 212 is the place onto which objects 214–220 are copied in order to build an object oriented application. Window 212 is also an object.

Some objects have event and action attributes. Event attributes determine an object's behavior in response to events performed on the object. Action attributes determine an object's behavior in response to an action message sent to the object. For example, a button object receives a "click" event when a mouse button is pressed and released over the object. The button object's click event attribute can be set such that the button sends an action message to another object whenever the button receives a click event.

Object attributes can be changed by calling up an attribute sheet for an object or group of objects. The attribute sheet contains a list of attributes for that object. If the sheet for a group of objects is called up, only the attributes that are common to the group will be on the sheet. Using this sheet, the user can edit of the attribute values of an object or objects.

A handle is a visual representation of an attribute. A developer can cause an attribute to be displayed as a handle by setting an option on the attribute sheet. Thus, an object can have zero or more handles depending on the settings chosen by the developer. Initially, object attributes are set such that there is a handle for each commonly used event or action associated with the object. A preferred embodiment of the present invention displays handles as shapes connected to their associated object with a line. The shape of a handle identifies its function. For example, event handles are displayed as small squares while action handles are displayed as small circles. In addition, each handle has a corresponding label showing the event or action associated with the handle. The developer can turn off label display by changing a setting in the OODE.

Figure 3:
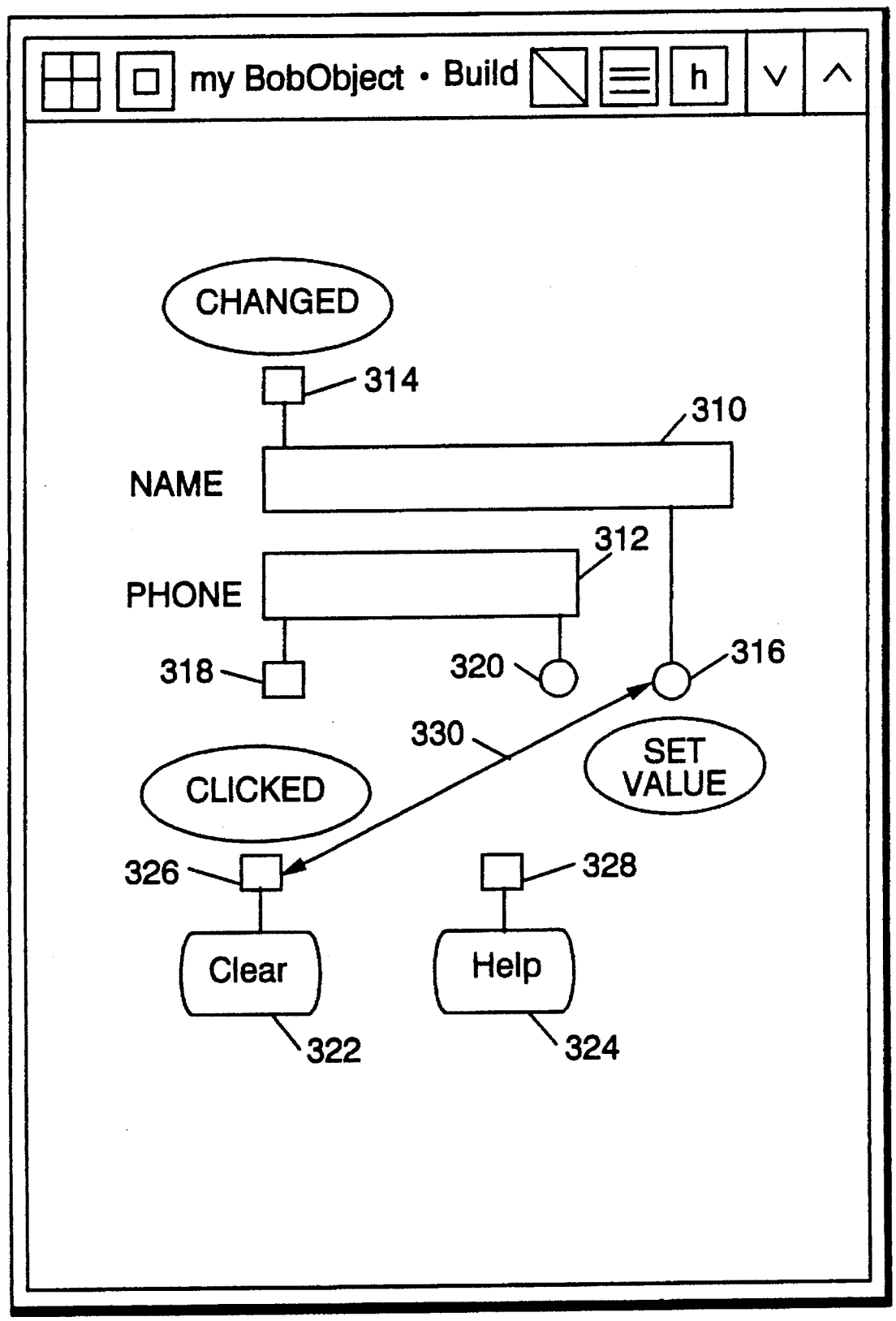
FIG. 3 is a pictorial representation of a window in an object oriented developing environment.

FIG. 3 shows several objects with their initial handle and display attribute settings. Text field objects "name" 310 and "phone" 312 each have one event handle 314, 318 and one action handle 316, 320. Button objects "clear" 322 and "help" 324 have one event handle each 326, 328. Handles 314 and 316 of same object 310 are labeled "changed" and "setValue," respectively. Similarly, handle 326 of clear button object 322 is labeled "click." Also displayed is a connection 330 from clear button object 322 handle 326 to setValue handle 316 of name text field object 310. In the preferred embodiment event handles are displayed using a particular shape, such as a square, and action handles are displayed using a different shape, such as a circle, to help the user easily distinguish the type of handle.

Handles and labels are automatically positioned by the OODE such that they do not overlap other objects or handles. In addition, the developer can use mouse 26 or another pointing device, such as a track ball, to drag the handle to a new position. In a preferred embodiment of the present invention, the developer is allowed to move a handle by dragging the line connecting the shape to the object.

The developer creates connections between handles by selecting an event handle with mouse 26 and dragging it to a handle on another object. This dragging action creates a connection and causes the OODE to display a line between the handles. For example, connection 330 between event handle 326 and action handle 316 indicates that clear button object 322 is linked with name text field 310. Specifically, the connection indicates that when a mouse button click event occurs on clear button 322, the setValue action of name text field 310 is triggered. The setValue action clears the contents of name text field 310. Thus, clicking on clear button 324 clears name text field 310.

The developer can also connect event handles to other event handles. By using event to event connections, for example, the developer can send click events to multiple buttons when the user clicks one button. To connect an event handle to an object without handles, the developer drags the handle to the object itself. Then, the normal menu window will appear over that object.

Although the present invention and its advantages have been described in detail, it should be understood that various changes, substitutions and alterations can be made herein without departing from the spirit and scope of the invention as defined by the appended claims.

What is claimed is:

1. A method, of facilitating connections between objects in an object oriented development environment adapted for execution on a data processing system, comprising the steps of:

displaying a plurality of objects, each of said objects having an associated handle, on a display device of said data processing system;

selecting a first handle associated with a first of said objects;

dragging said selected handle to a second handle associated with a second of said objects, forming a connection between said first object and said second object.

2. The method of claim 1, further comprising the step of:

displaying said connection on said display device as a line from said first handle to said second handle.

3. The method of claim 1, wherein each of said associated handles is one of a plurality of handle types.

4. The method of claim 3, wherein said handle types comprise:

event handles; and action handles.

5. The method of claim 3, wherein each of said handle types has a predetermined characteristic associated with said display of said type of handle.

6. The method of claim 1, further comprising the step of:

displaying a label associated with a handle associated with an object on said display device.

7. The method of claim 1, further comprising the step of:

selecting a handle associated with an object of said objects; and moving said handle to a new position respective to said object.

8. The method of claim 1, further comprising the step of:

editing an attribute associated with an object of said objects; and updating said display responsive to said editing of said attribute.

9. A data processing system for connecting objects having handles, comprising:

display means for displaying objects, each of said objects having an associated handle;

selecting means for selecting a first handle associated with a first of said objects;

memory means for storing a coordinate location of said selected first handle;

dragging means for dragging said selected first handle to a second handle associated with a second object; and processor means for forming a connection between said first object and said second object.

10. The data processing system of claim 9, wherein said processor means further comprises means for displaying said connection on said display device as a line from said first handle to said second handle.

11. The data processing system of claim 9, wherein each of said associated handles is one of a plurality of handle types.

12. The data processing of claim 11, wherein said handle types comprise:

event handles: and action handles.

13. The data processing system of claim 11, further comprising:

a predetermined characteristic associated with the display of each said type of handle.

14. The data processing system of claim 9, wherein said memory means further comprises:

means for storing labels associated with said handles, said labels to be displayed on said display means.

15. The data processing system of claim 9, wherein said selecting means further comprises:

means for selecting a handle associated with an object of said objects:

means for moving said handle to a new position.

16. The data processing system of claim 9, further comprising:

editing means for editing an attribute associated with an object of said objects;

updating means for updating said display means responsive to said editing of said attribute.

17. An object oriented development environment having objects and handles associated with each of said objects, comprising:

a first handle associated with a first object of said objects;

a second handle associated with a second object of said objects: and a pointing device for selecting said first handle and dragging said first handle to said second handle, forming a connection between said first handle and said second handle.

18. The object oriented development environment of claim 17, further comprising:

a label associated with a handle of an object of said objects.

* * * * *